US011004315B1

(12) United States Patent
Goldman et al.

(10) Patent No.: US 11,004,315 B1
(45) Date of Patent: May 11, 2021

(54) METHODS AND APPARATUS FOR SMART DISTRIBUTION OF RESTAURANT ITEMS AND NOTIFICATION OF ORDER READINESS

(71) Applicant: SmartBAR Corp., Jacksonville, FL (US)

(72) Inventors: Alec Goldman, Miami, FL (US); Freddy Sidi, Jr., Miami, FL (US)

(73) Assignee: SmartBAR Corp., Jacksonville, FL (US)

( * ) Notice: Subject to any disclaimer, the term of this patent is extended or adjusted under 35 U.S.C. 154(b) by 0 days.

(21) Appl. No.: 16/828,165

(22) Filed: Mar. 24, 2020

Related U.S. Application Data

(60) Provisional application No. 62/975,993, filed on Feb. 13, 2020, provisional application No. 62/938,504, filed on Nov. 21, 2019.

(51) Int. Cl.
*G08B 21/00* (2006.01)
*G08B 7/06* (2006.01)
(Continued)

(52) U.S. Cl.
CPC ........... *G08B 7/068* (2013.01); *G05B 19/042* (2013.01); *G06Q 30/0635* (2013.01);
(Continued)

(58) Field of Classification Search
CPC ...... A63F 2009/2454; A63F 1/18; A63F 1/02; A63F 1/12; A63F 1/14; A63F 2001/008; A63F 2009/241; A63F 2009/2419; A63F 2009/2455; A63F 2009/2489; A63F 2009/2492; A63F 2009/2494; A63F 2009/2497; A63F 3/00643; G07F 17/3293; G07F 17/32; G07F 17/3232; G07F 17/3223; G07F 17/3258; G07F 17/3211; G07F 17/322; B08B 9/0557; B08B 9/055; B08B 9/0551; B08B 9/0553; F16L 55/40; F24D 11/003; F24D 11/004; F24D 11/0214; F24D 2200/11; F24D 2200/12; F24D 2200/14; F24D 2200/16; F24D 2200/20; F24D 2220/10; F24H 2240/08; F24H 7/04;
(Continued)

(56) References Cited

U.S. PATENT DOCUMENTS

10,371,564 B2 * 8/2019 Perez Jacome .... G01G 19/4144
10,657,780 B1 * 5/2020 Kline ....................... G08B 7/06
(Continued)

*Primary Examiner* — Daniel Previl
(74) *Attorney, Agent, or Firm* — Rogers Towers, P.A.; Joseph P. Kincart (57) ABSTRACT

A Smartserv platform system and methods are provided. When a restaurant item order is placed via a smart device app interface, the order is transmitted to computer server which notifies a preparer. The order is also transmitted to a Smartserv platform, which generates a user identifiable area, such as a color-coded area of a Smartserv platform surface within which an ordered restaurant item will be distributed, thereby enabling simpler and more organized restaurant item ordering and distribution. The computer server may also notify the customer that the customer's order is ready for pickup at the area designated by the appropriately colored lights. This improves known customer-notification methods.

20 Claims, 10 Drawing Sheets

(51) Int. Cl.
*G06Q 50/12* (2012.01)
*G06Q 30/06* (2012.01)
*G08B 5/36* (2006.01)
*H04W 4/021* (2018.01)
*G05B 19/042* (2006.01)

(52) U.S. Cl.
CPC ............... *G06Q 50/12* (2013.01); *G08B 5/36* (2013.01); *H04W 4/021* (2013.01); *G05B 2219/23258* (2013.01)

(58) Field of Classification Search
CPC ........ F24H 7/0441; F24H 9/20; F24H 9/2014; F24S 10/45; F24S 10/95; F24S 60/10; F28D 20/02; F28D 20/021; G06Q 10/06; G06Q 10/10; G06Q 30/0252; G06Q 50/02; G06Q 50/26; Y02A 20/402; Y02B 10/20; Y02B 10/40; Y02B 10/70; Y02B 30/12; Y02B 30/52; Y02E 10/44; Y02E 60/14; Y10T 29/4935; A61B 2562/0219; A61B 5/0006; A61B 5/0008; A61B 5/0013; A61B 5/002; A61B 5/0022; A61B 5/0077; A61B 5/01; A61B 5/02055; A61B 5/0261; A61B 5/0402; A61B 5/0476; A61B 5/0488; A61B 5/053; A61B 5/1112; A61B 5/1116; A61B 5/1117; A61B 5/1118; A61B 5/6803; A61B 5/6806; A61B 5/6807; A61B 5/681; A61B 5/6824; A61B 5/6826; A61B 5/6891; A61B 5/7264; A61B 7/00; A61B 7/04; A61B 7/045; A61B 8/00; A61B 8/06; A61B 8/0808; A61B 8/488; A61B 8/565; C23C 14/243; C23C 16/448; F27D 5/00; G06F 19/00; G08B 21/02; G08B 21/0423; G08B 21/0446; G08B 21/0453; G08B 21/0461; G08B 21/0476; G08B 21/0484; G08B 21/0492; G08B 25/016; G16H 15/00; G16H 20/13; G16H 20/30; G16H 40/67; G16H 50/20; G16H 80/00; G16Z 99/00; H04M 2250/12; H04M 3/5116; H04W 84/18

USPC ............ 340/540, 541, 550, 572.1, 613, 666, 340/691.6, 7.51, 7.55, 825.49, 286.09, 340/286.08

See application file for complete search history.

(56) References Cited

U.S. PATENT DOCUMENTS

| | | | |
|---|---|---|---|
| 2010/0312625 A1* | 12/2010 | Miller | A63F 1/02 705/14.5 |
| 2012/0323661 A1* | 12/2012 | Otto | G06N 5/025 705/14.25 |
| 2014/0183269 A1* | 7/2014 | Glaser | G06F 3/0346 235/492 |
| 2015/0167151 A1* | 6/2015 | Dempster | C23C 14/243 427/248.1 |
| 2019/0304238 A1* | 10/2019 | Ambauen | G07F 9/006 |

* cited by examiner

METHODS AND APPARATUS FOR SMART DISTRIBUTION OF RESTAURANT ITEMS AND NOTIFICATION OF ORDER READINESS

CROSS-REFERENCE TO RELATED APPLICATIONS

The present application claims priority to U.S. Provisional Patent Application Ser. No. 62/975,993, filed Feb. 13, 2020, and entitled Methods and Apparatus for Smart Distribution of Restaurant Items, and to U.S. Provisional Patent Application Ser. No. 62/938,504, filed Nov. 21, 2019, and entitled Methods and Apparatus for Smart Distribution of Restaurant Items. The contents of each of these applications is relied upon and incorporated herein by reference.

FIELD OF THE DISCLOSURE

The present disclosure relates to methods and apparatus for providing an automated distribution platform for delivery of items ordered to be picked up or delivered at or to a certain place after preparation of the items. More specifically, the present invention relates to a Smartserv system for placing an order for restaurant items via interaction with a smart device and distributing the ordered items via a color-coded area designated on a Smartserv tray. Once placed on Smartserv tray, a notification is automatically generated and sent to an end user, food runner, or other stakeholder via a smart phone application and/or colored lights on the Smartserv tray.

BACKGROUND OF THE DISCLOSURE

Presently, placing an order and receiving food and restaurant items at a crowded retail food and drink establishment (sometimes referred to herein as a "restaurant") may be a frustrating experience for patrons and a logistical challenge for establishment personnel.

In addition to the difficulties associated with ordering a restaurant item (especially at crowded establishments that involve physical interaction, such as pushing and bodily displacement to reach a service area, such as a bar), distributing an ordered item may be difficult due to a volume of items prepared for consumption in the establishment as a whole. Prepared items may be confused or delivered to a wrong patron. In some establishments, patron names are regularly misspelled on prepared items and items are prepared according to erroneous instructions. Moreover, innovative solutions suitable for a restaurant setting may be limited due to the aesthetic considerations involved.

SUMMARY OF THE DISCLOSURE

Accordingly, the present invention provides apparatus and methods for efficient ordering of restaurant items and distribution of the restaurant items as preparation of those items is completed. The distribution is made in an efficient and aesthetically pleasing manner.

A user, which may be a patron, a server, or other person or automation, places an order for a restaurant item via interaction with a smart device application. The restaurant item order progresses through a computer server to notify a preparer of the restaurant item order. The computer server also designates one or more portions of a Smartserv platform as a delivery location for the restaurant items to be distributed to the patron. The Smartserv platform may illuminate in a color associated with the order, such as red, in a first pattern (e.g., blinking lights). Once the preparer has completed preparation of the restaurant item order, the preparer places the restaurant item order on the portion of the Smartserv platform allocated to the restaurant item order, which causes the illuminate to change to a second pattern (e.g., a constant red).

The order-fulfillment and color-assignment functions may progress through a smart device application. This smart device application may be modular and easily appendable to other, existing smart device application for existing restaurant applications.

For example, a user may place an order for two martinis using a smart device application. After paying for these martinis through the application, the user may receive a payment confirmation and be informed that their drinks will be on the cells of the Smartserv platform colored blue. At around the same time, LED circuits on two cells may illuminate with blinking blue lights. Once the order is fulfilled, the drinks may be placed on the two blue cells of the Smartserv platform. Motion sensors (or other change-in-condition sensors) may detect that the order has been fulfilled. This may cause the blue LEDs to change patterns (e.g., from blinking to steady state), send an order-readiness signal to the user's smart device, and in some embodiments, cause a secondary notification light on the side of the Smartserv platform to illuminate.

In the following sections, detailed descriptions of examples and methods of the invention will be given. The description of both preferred and alternative examples though thorough are exemplary only, and it is understood that to those skilled in the art that variations, modifications and alterations may be apparent. It is therefore to be understood that the examples do not limit the broadness of the aspects of the underlying invention as defined by the claims.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for methods and apparatus for automated ordering and distribution of restaurant items using a Smartserv platform. A Smartserv platform includes a surface with designated areas for placement of prepared restaurant items that are associated with an order received via an automated process initiated by a smart device.

According to the present disclosure, a restaurant item order may be placed via interaction with a smart device application. The smart device is placed in logical communication with a communications network and sends the restaurant item order via the communications network to a Smartserv server. The server may communicate the restaurant item order to a restaurant item preparer and correlate a designated area of a Smartserv platform with the order. In some embodiments, the designated area of a Smartserv platform is virtually appended to the restaurant item order.

Although this specification is presented in view of the ordering, preparation, and delivery of restaurant items, it will be readily understood to one of ordinary skill in the art that the essential principles of this disclosure may apply in equal measure to other delivery situations. For example, the ordering, notification, and display features of this invention could be useful in fields such as off-site restaurant delivery, package delivery, ordering from a shop such as a grocery store or bookstore, and the like.

Some embodiments additionally include providing an indicator of the designated area of the Smartserv platform that allows a user to identify which area of the Smartserv platform contains the user's restaurant order items. An indicator of the designated area may include, by way of non-limiting example, illuminating the designated area of the Smartserv platform according to the color-coding associated with the restaurant item order.

Fully prepared restaurant items included in the order may be placed in the corresponding area of the Smartserv platform and the user may receive an alert via the smart device app indicating that the restaurant item order is ready for the user to pick up. A visual notification on the Smartserv platform may assist with notification and easy-identification aspects of this invention.

Figure 1:
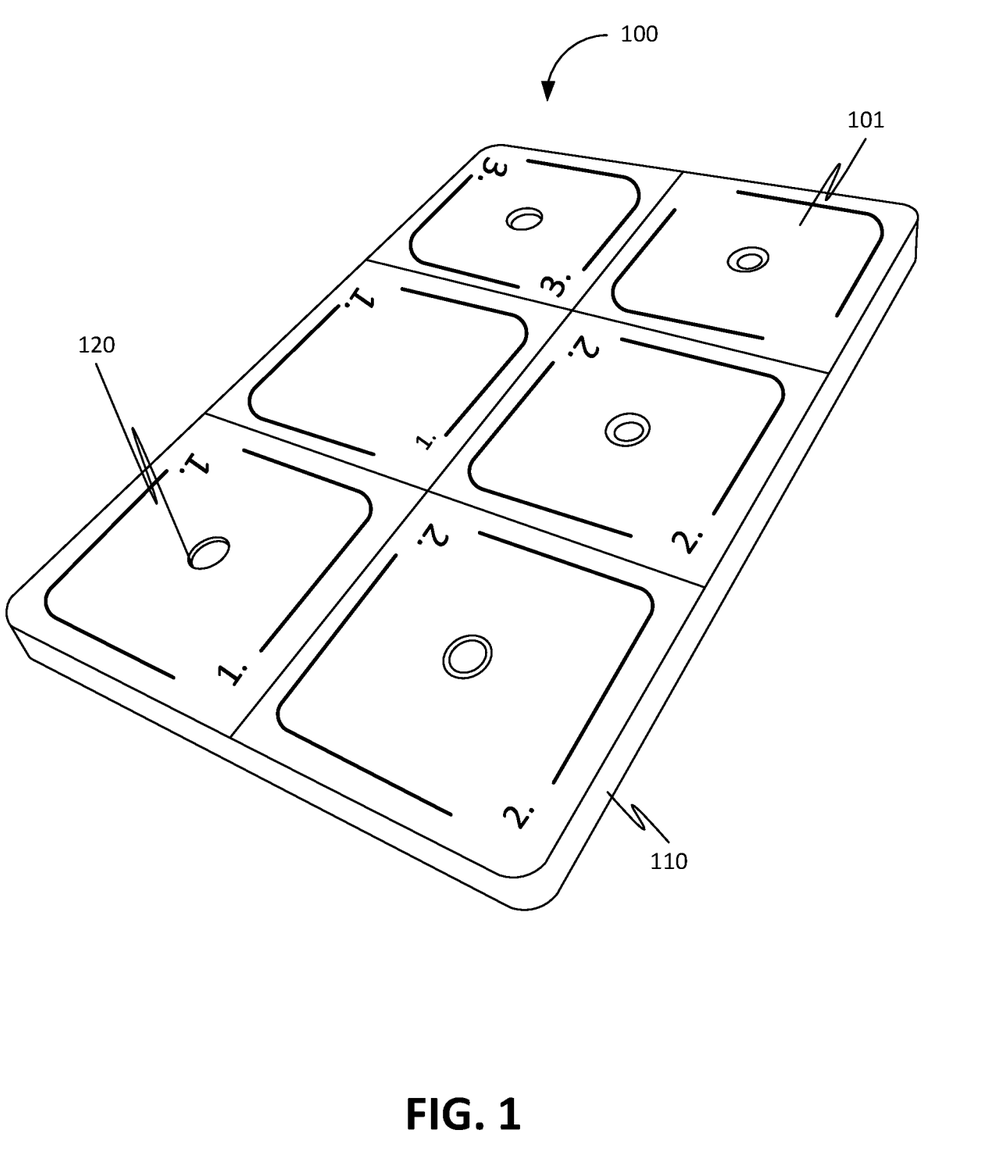
FIG. 1 illustrates an exemplary embodiment of a Smartserv platform without illumination.

Referring now to FIG. 1, an exemplary embodiment of a 3×3 Smartserv platform 100 is shown. Smartserv platform 100 may generally have any planar orientation and any appropriate size. Smartserv platform 100 as shown in FIG. 1 includes a roughly flat surface 101 and a thin casing 110 underneath surface 101 in which to store electrical components, such as LED lights, infrared transmitters, and the like. Surface 101 may comprise several distinct portions (in this embodiment, the portions are shown as squares). In some embodiments, Surface 101 may be made of an insulating material. Surface 101 may also be temperature-controlled through circuitry located within casing 110. Sensors 120 within each cell may be operative to detect a change in condition of the cell, such as a restaurant item being placed on the cell. Sensors 120 may include, without limitation, a motion sensor, weight sensor, infrared transmitter, thermocouple, and the like.

Figure 2:
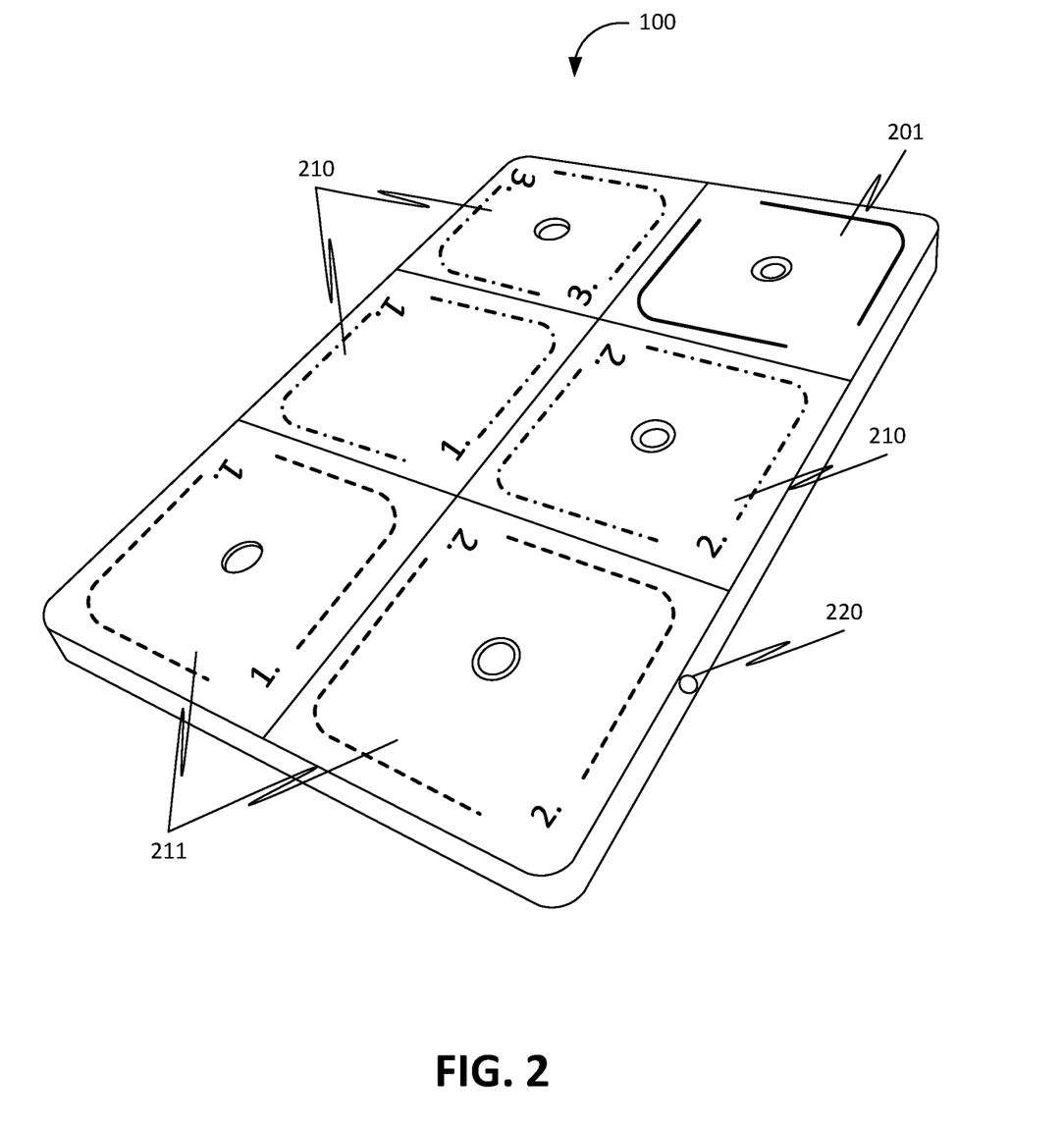
FIG. 2 illustrates an exemplary embodiment of a Smartserv platform with some portions illuminated to show the correct portion of a Smartserv platform for distribution of ordered restaurant items.

Referring now to FIG. 2, Smartserv platform 100 is shown in operation from a top-down view. When a restaurant item order is placed, portions of Smartserv platform 100 may provide a visual response. This visual response may be organized in some fashion. For example, if the restaurant item order comprises two restaurant items, then two adjacent circles (or other defined shape or pattern) may illuminate in a same color or pattern, as demonstrated at 210.

In some embodiments, a Smartserv platform may further include one or more alphanumeric characters, which may work to assign each restaurant item in a restaurant item order to an individual patron or a particular a table. For example, a user may place an order via a smart device app that is associated with a particular table at a food and/or drink establishment. The order associated with the table may include two restaurant items, each restaurant item may be represented by a same color/pattern, which may be indicated, for example via a perimeter of an area of the Smartserv platform, or an area of Smartserv platform being illuminated by a specified light color. A queue number may also be indicated.

In various embodiments, illumination may be via lighting, such as light-emitting diode (LED) arrays beneath a transparent or translucent surface material. In such embodiments, illumination of patterns of the LEDs will illuminate portions of the Smartserv platform surface. Borders of sections (such as areas) of the Smartserv platform surface may be illuminated via LEDs or conventional lighting mechanisms. Projections of colored light may be cast onto a defined area of the Smartserv platform surface. And other methods of illuminating a particular area of the Smartserv platform surface may also be desirable. When food items are ready and have been placed in the designated cell(s), a smart device notification may prompt a waiter, food runner, or customer to proceed to the appropriately illuminated cell. In some embodiments, the color of a cell relates to a status of the order (e.g., a green cell indicates that food is ready; a red cell may indicate that food is not ready).

In some embodiments, the LED color may be chosen at random, based on the color range of the LEDs and the number of other active orders. (For example, if one order has been assigned the color red, and no other orders are outstanding, then the color of the next order is preferably a green or a blue, instead of a fuchsia.) Other embodiments include a sequential order of LED colors to avoid concurrent use of similar colors. Moreover, as a result of the LEDs or other lighting means illuminating the cell, the temperature of the cell may reach a temperature appropriate for serving of the restaurant item (e.g., a cold cell for a drink and a hot cell for warm food).

In some embodiments of the present invention, a Smartserv platform surface may be divided into set portions or cells, wherein each set portion includes a set area onto which restaurant items may be placed in fulfillment of an order. If an order requires more area than a set portion provides, then multiple set portions may be allocated to the fulfillment of a single order. In other embodiments, an area included in a portion of the Smartserv platform surface designated to fulfillment of an order may be adjusted according to a number of items ordered and a size of each item.

In some embodiments, an area required to fulfill may be determined by a controller executing software. For example, each item may have a preferred fulfillment area associated with it, and the controller may add up the preferred fulfillment area associated with each order item. The controller may then transmit to a Smartserv platform a fulfillment area required for placement of the ordered restaurant items included with a particular order and illuminate (e.g., by color coding or other designation) the area of the Smartserv platform that contains the user's ordered restaurant items. In this way the controller may dynamically define areas of the area of the Smartserv platform based upon which items are ordered and the preferred fulfillment area for those ordered items.

In another aspect, in addition to or in the place of color-coded designated areas of Smartserv platform 100, restaurant items may be assigned different numbers to denote which restaurant item is included in which order. If multiple orders are pending simultaneously, then other panels on Smartserv platform 100 (e.g., panel 211) may illuminate in a different color/pattern of light than the color/pattern shown in the first set of panels (210).

This color-assignment process may proceed according to an algorithm. The algorithm may be dependent upon the size of the Smartserv platform 100. For example, the color-assignment algorithm may be different for a 3×3 platform than for a 2×3 platform. One embodiment of the color-assignment algorithm may seek to maximize the distance between respective orders, which may be particularly useful where one order occupies multiple cells. Another embodiment of the color-assignment algorithm may seek to centralize all of the orders (especially in a larger embodiment of Smartserv platform, such as the one shown in FIG. 10), while also providing sufficient space between each order. Where it may not be possible to ensure a desirable amount of distance between two sets of orders (e.g., if every unoccupied cell has an occupied cell adjacent to it), other characteristics of the orders may be used to assign cells. For example, orders may be grouped according to temperature—if a new order of hot food cannot be sufficiently isolated from all other orders, then it may be desirable to group it closer to other hot food orders on Smartserv platform 100. Moreover, if an order is unfulfilled, cells that were previously designated for that order may be rearranged to accommodate this ordering. In this way, order placement may be optimized according to the identity of the order.

In another aspect, one or more secondary notification lights 220 may be positioned on the side of Smartserv platform 100 to provide at-a-glance notifications from a distance to a user who is not in visual contact with a perpendicular plane of the Smartserv platform 100 (i.e., as might be necessary to see the lights on panel 210). Secondary notification light 220 may illuminate in one or more colors corresponding with colors illuminated on panels 210 and 211. By way of non-limiting example: suppose User 1 inputs an order into a smart device application (or other ordering means, including talking to a server) and receives a notification that the order will be placed on a blue cell. At this point, secondary notification light 220 may remain dark. When the order is complete and placed on the appropriate cell, that cell will illuminate with a blue border. This may also cause secondary notification light 220 to illuminate in a blue color, to further enhance the notification features of the present invention.

In some embodiments, the secondary notification light 220 is operable to accommodate multiple order colors. For example, suppose that at the same time User 1 input his order, User 2 input a second order and received a notification that her order, once fulfilled, would be on a green cell. Once both orders are put on Smartserv platform 100, secondary notification light 220 can, in some embodiments, have a mechanism to alert both users that their disparate orders are fulfilled. In one embodiment, secondary notification light 220 may alternate between green and blue (and any other order colors) at a predetermined frequency. This frequency may modulate based on how long the order has been placed on the tray. For example, if one or more of the orders have been sitting on Smartserv platform 100 for an excessive amount of time, secondary notification light 220 may blink more rapidly (or may spend more time on one color before transitioning to another).

Figure 9:
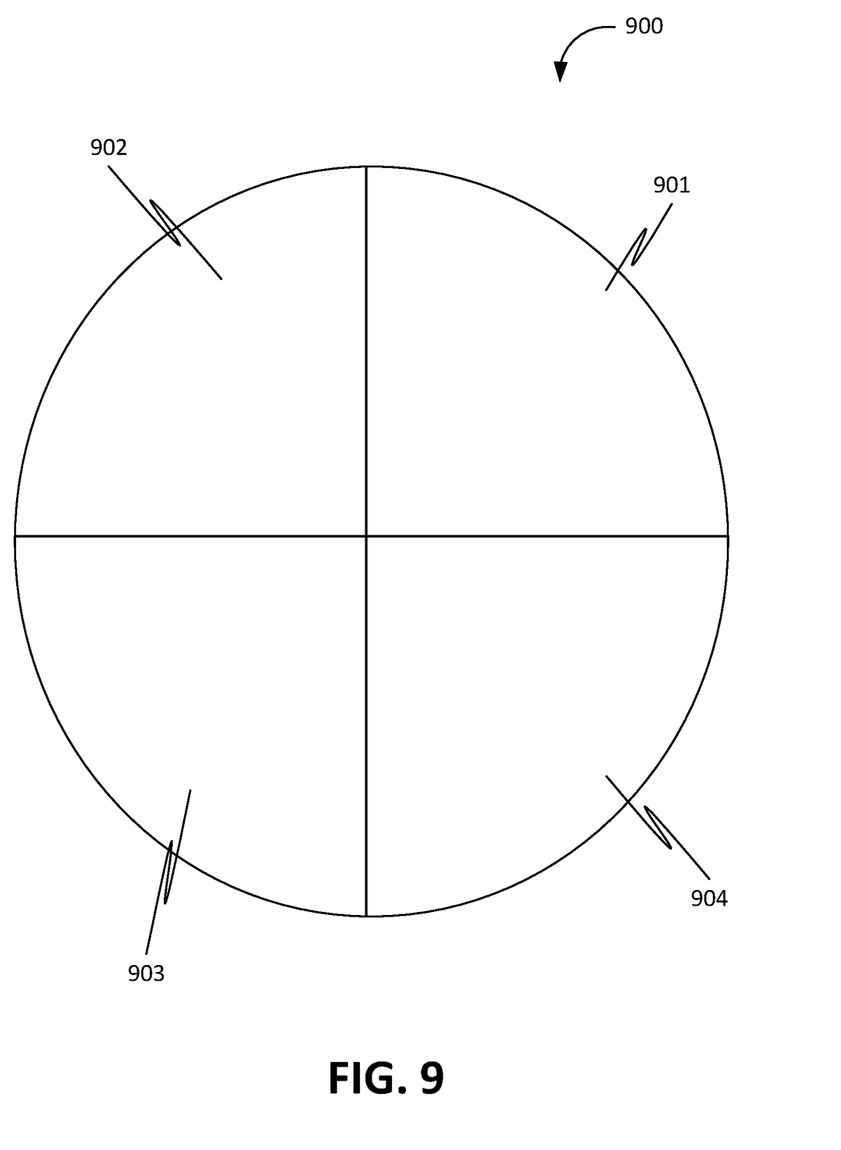
FIG. 9 illustrates an alternative embodiment of a secondary notification light, divided into segments to correspond with various orders.

In an alternative embodiment, secondary notification light 220 may be subdivided into multiple sections that can illuminate based on the number of colors corresponding to active orders. This embodiment may work better on a Smartserv platform 100 with a significant thickness to allow resolution of the various colors from a distance. An example of this is shown in FIG. 9. Segmented secondary notification light 900 is shown with segments 901-904. Each segment 901-904 may be operative to illuminate alone or in conjunction with another respective segment based on orders received by a server in logical connection with Smartserv platform 100 (and, by extension, segmented secondary notification light 900).

For example, if one order is queued and has been assigned the color red, then any or all of segments 901-904 may illuminate red once the order is fulfilled and placed on Smartserv platform 100. If two orders are queued, with one assigned the color red and the other the color blue, then a different combination of colors may illuminate on segments 901-904. As a non-limiting example, segment 901 may illuminate red, while segment 902 may illuminate blue (and segments 903-904 may remain dark). Alternative, segments 901-902 may illuminate red and segments 903-904 may illuminate blue. In still another non-limiting example, segments 901 and 904 may illuminate red and segments 902 and 903 may illuminate blue.

If three orders are queued, then in exemplary embodiments, one segment will remain unilluminated, unless there is a reason to emphasize one particular order over another. For example, it might be that segment 901 is illuminated red, segment 902 is illuminated blue, segment 903 is illuminated green, and segment 904 is dark. However, if one order is prioritized over another based on a priority criterion, then segment 904 may also illuminate in that color. In this way, for example, segments 901 and 904 may both illuminate red, while segment 902 is illuminated blue and segment 903 is illuminated green. A priority criterion may include any reason to enhance the notification of one order at the expense of the others, including without limitation: a size of an order, a cost of an order, or a distance between the segmented secondary light 900 and the person picking up the order from Smartserv platform 100.

The LED circuits in segments 901-904 may also be in logical connection with a randomizer, gate, or other circuitry enabling the lights to change color, blink at certain frequencies, or engage in other visually appealing effects. For example, if a red order and a blue order are fulfilled and placed on the tray at the same time, then segments 901-902 may illuminate red initially, with segments 903-904 being illuminated blue. The segments may alternate illuminations to create visually appealing effects, such as a "rotating" color wheel.

Referring back to FIG. 2, additional embodiments may include blank spaces 201 on a Smartserv platform 100 to indicate spaces in which restaurant items should not be placed. In some embodiments, when the restaurant items are removed from their respective areas (as measured by, for example, weight sensors, motion sensors, breaks in an infrared beam, charged coupled devices, optical sensor circuits and the like associated with a particular portion of the area of the Smartserv platform), an indicator may cease, such as, for example, ceasing illumination of an area.

Figure 3:
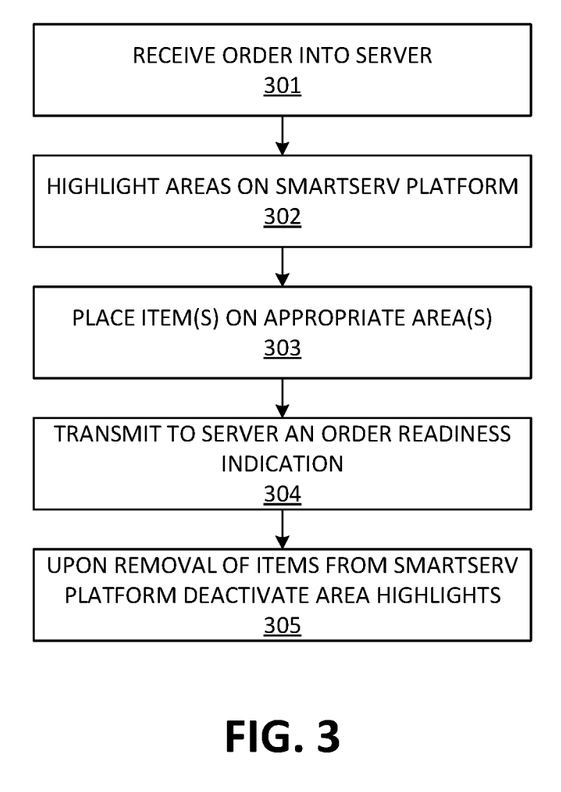
FIG. 3 illustrates exemplary method steps associated with using a Smartserv platform.

Referring now to FIG. 3, exemplary method steps associated with some embodiments of the invention including a Smartserv platform are shown. At method step 301, a restaurant item order is received into a server. The order may be placed, for example via interaction with a user interface on a smart device. The user interface may be made functional via execution of an app installed onto the smart device. The server may be an MQTT server or any other appropriate protocol and may include one or more intermediate servers, such as a queue server. The restaurant item order may comprise one or more restaurant items, including standardized restaurant items or custom-made restaurant items. The restaurant items may be alcoholic or non-alcoholic. The restaurant item order may be transmitted to the server by a waiter at a traditional computer interface, a waiter using a tablet, or a customer using a smart device. In exemplary embodiments, the restaurant item order may also be associated with a table number. Geofencing may be used to ensure that the customer ordering restaurant items through a smart device is within a certain spatial domain (e.g., the restaurant) by reference to a GPS, Wi-Fi, Bluetooth, or other location-finding tool found on the smart device.

At method step 302, areas are highlighted on a Smartserv platform. As discussed above, a Smartserv platform may include a surface that is subdivided physically or virtually into discrete area, in which one or more of the areas may be readily identifiable by a user that is retrieving restaurant items that have been prepared and ready for distribution. One mechanism for readily identifying an area associated with a particular order may include color coded illumination.

Illumination mechanisms, such as LED lights, may be placed in logical connection with a controller, and the controller may control one or more of: a color, a pattern, a pulse or other aspects of the lights. Additionally, the entirety of the surface, or any subdivision of the surface, may be made of insulating material or may be temperature-controlled. This may be desirable when storing restaurant items that are best if maintained in a heated or cooled state. The areas are highlighted based on the restaurant item order. For example, in an exemplary embodiment, the Smartserv platform may comprise seven columns and six rows of rectangular areas. Each column may correspond to one order. If a first order is transmitted to the server having two restaurant items, then two areas in the first column may illuminate. These areas may have a same color or different colors. The areas may also display colors in various patterns. In some embodiments, the color indication is performed by LED RBG matrices, such as a standard WS2812B strip.

If a second order is transmitted before the first order has been completed, then another column may illuminate accordingly. The colors may be the same as or different than the colors corresponding to the first order. In some embodiments, in addition to the colors, numbers may illuminate that correspond with an order number or a particular patron associated with one restaurant item in a multi-restaurant item order. In some embodiments, the restaurant item order is a first-in, first-out queue.

At method step 303, restaurant items are placed on appropriate areas of a Smartserv platform 100. In exemplary embodiments, a server that receives the restaurant item order will transmit both the restaurant item order and cell information to a preparer (or other staff) fulfilling the order. For example, if a two-restaurant item order is transmitted to the preparer, each restaurant item of the order may be represented by an ordered pair, triplet, or other data combination. In set notation, a restaurant item order may look like: {(hamburger and draft beer; Cell 2,4; Blue); (Margarita; Cell 3,4; Blue)} to indicate that the first restaurant item order includes a hamburger and a draft beer and should be placed on the blue-illuminated cell located in row 2, column 4; while the second restaurant order item is a margarita that should be placed on the blue-illuminated cell located in row 3, column 4. In an alternative embodiment, the restaurant item order may look like: {(hamburger and draft beer, Cell 2,4; Blue; 2), (Margarita, Cell 3,4; Green; 2)}. Here, the areas are illuminated in different colors, but both areas also contain the number 2. This may simplify the restaurant item distribution process when a waiter, food runner, or other user removes the restaurant items. Other variations may be deployed and based upon, for example a description and type of restaurant order items to be distributed via an area of the Smartserv platform.

At method step 304, when an order has been fulfilled, a signal may be transmitted to the server to indicate that the order is ready for distribution. This order may then be transmitted from the server to a user, such as: a patron, a waiter, or another stakeholder. Then At method step 305, once the ordered restaurant items have been retrieved from the Smartserv platform, the corresponding Smartserv platform area highlights may be deactivated and made available for distribution of items included in a subsequent order. In exemplary embodiments, transponders, such as, for example a sensor translating a pressure into a digital value (e.g., digital weight-detecting sensors) or motion sensors beneath the areas may transmit to a controller a digital value quantifying a presence or absence of an item on at particular area of a digital value quantifying a presence of removal of a restaurant item has been removed.

Figure 4:
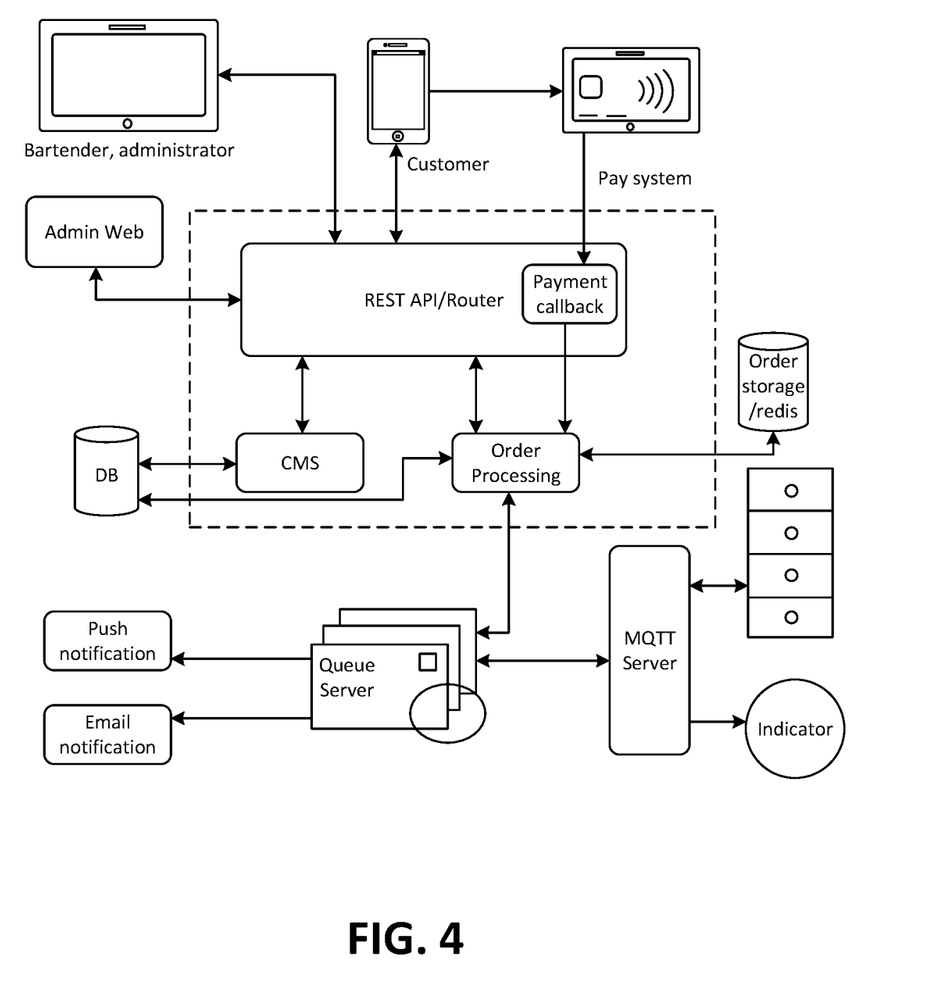
FIG. 4 illustrates an exemplary component diagram illustrating a block diagram of an exemplary Smartserv platform system.

FIG. 4 demonstrates an exemplary process diagram describing the above method. The architecture displayed in FIG. 4 is meant to be a non-limiting example of one architecture suitable to deploy the above method. As shown in FIG. 4, various stakeholders can have access to different levels of information at different times. For example, a smart device associated with the customer may be able to view the ordered restaurant item, its location in a fulfillment queue, and the restaurant item's location in the bar. The customer's smart device may also receive a notification about the readiness of the restaurant item and allow for payment process. Because of the simplicity of this method, the present invention is easily adaptable to existing restaurant APIs.

A computer associated with the preparer may be able to accept an order, sort multiple restaurant item orders, and receive information about other, similar orders to allow for better sorting. This information may also be transmitted to bar managers or system administrators. Further, bar managers and system administrators may be able to create and edit restaurant item menus; learn macroscopic and microscopic details about restaurant items being ordered. Additionally, if the method of FIG. 3 is implemented using a smart device to allow customers to order and pay for restaurant items, then preparers or bar managers may be able to refund money paid for an order.

An advantage of this invention is that, in some embodiments, it is easily adaptable to existing restaurant APIs. A standard restaurant API may connect a customer with a pay system. Once the customer has made a payment (and concurrent order), the restaurant API may receive a payment callback to initiate order processing. A typical embodiment will see a payment confirmation sent to the customer. In some embodiments of the present invention, as part of the order processing step in the traditional restaurant API, a color-processing step may be added. This may allow a designated color to be sent to the customer. This color-coding information may also be sent to a queue server, which may or may not be separate from the restaurant API or router. The queue server may send the user a notification upon receipt of confirmation that the order is ready. The queue server may also send the command to illuminate the appropriate cells of a Smartserv platform and, in some embodiments, secondary indicator light. In exemplary embodiments, this may be controlled by a low-power server, such as an MQTT server.

Figure 5:
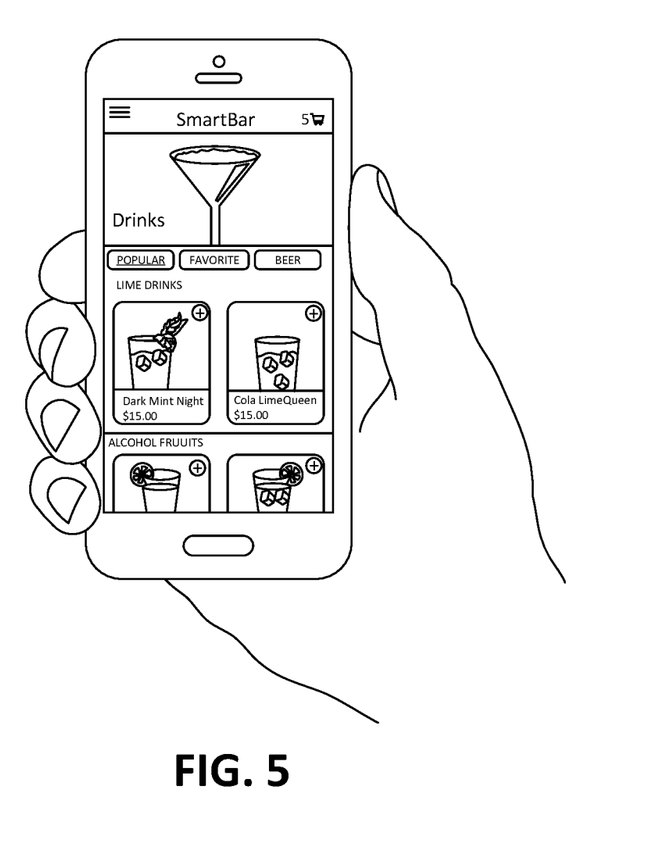
FIG. 5 illustrates an exemplary embodiment of a smart device application to be used in conjunction with the present invention.

Referring now to FIG. 5, an exemplary user interface is illustrated. The user interface may be generated on a smart device screen and include a selection of restaurant items that may be order by a user, such as, by way of non-limiting example, a patron or a server. In some embodiments, a selection of restaurant items may be based upon a menu provided by a particular establishment. For example, a GPS location determination made by a smart device may conclude that a patron is in Restaurant X and the app may display restaurant items offered on a menu of Restaurant X. The user may generate an order including one or more restaurant items displayed via interaction with the app-generated interface. The user may select one or more items that may be filtered according to characteristics such as price, caloric/alcoholic content, etc. The user may indicate the number of items desired, and in some embodiments, an urgency or a pickup time.

The smart device may transmit the order to a server, such as, for example via wireless communication, such as cellular communication or Wi-Fi communication. The server will notify a preparer of the order. The server may also designate an area of a Smartserv platform onto which prepared items may be placed when ready for distribution. When the items ordered have been properly prepared by the preparer, the items are placed on the designated area of a Smartserv platform. The server will also transmit a logical communication to the user's smart device indicating that the items ordered are ready to be retrieved from the designated area of a Smartserv platform. The user may make their way to the Smartserv platform. The server may also provide to the smart device an identification mechanism with which the user may identify the area from which the user may retrieve the ordered items.

Figure 6:
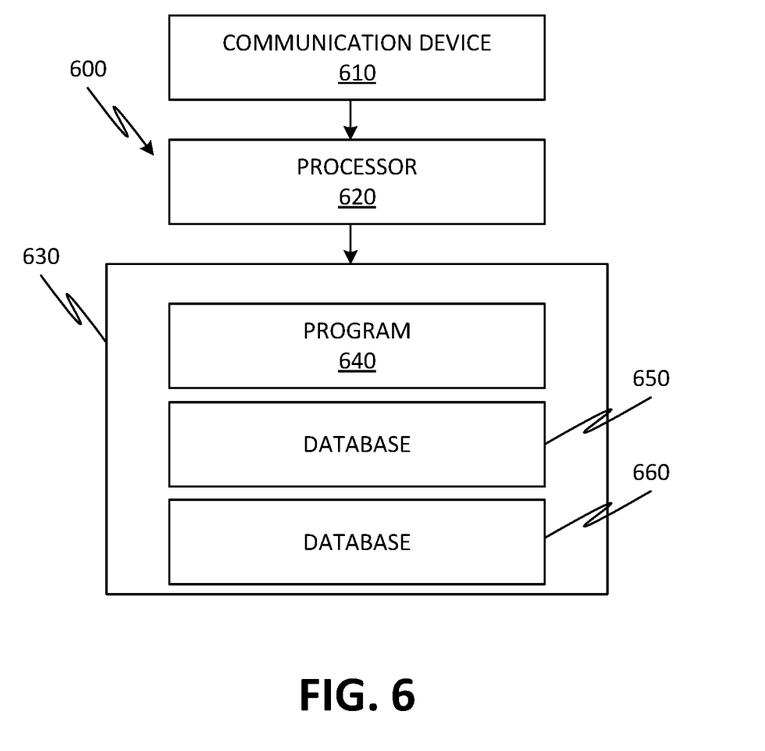
FIG. 6 illustrates a controller that may be used to implement aspects of the present disclosure including executable software.

Referring now to FIG. 6, an automated controller is illustrated that may be used to implement various aspects of the present invention, in various embodiments, and for various aspects of the present invention, controller 600 may be included in one or more of: a wireless tablet or handheld device, a server, a rack mounted processor unit. The controller may be included in one or more of the apparatus described above, such as a Server, and a Network Access Device. The controller 600 includes a processor unit 620, such as one or more semiconductor-based processors, coupled to a communication device 610 configured to communicate via a communication network (not shown in FIG. 6). The communication device 610 may be used to communicate, for example, with one or more online devices, such as a smart phone, smart tablet, personal computer, laptop, or other handheld or user worn device.

The processor 620 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random-Access Memory (RAM) devices and Read Only Memory (ROM) devices.

The storage device 630 can store a software program 640 with executable logic for controlling the processor 620. The processor 620 performs instructions of the software program 640, and thereby operates in accordance with the present invention. The processor 620 may also cause the communication device 610 to transmit information, including, in some instances, control commands to operate apparatus to implement the processes described above. The storage device 630 can additionally store related data in a database 650 and database 660, as needed.

Figure 7:
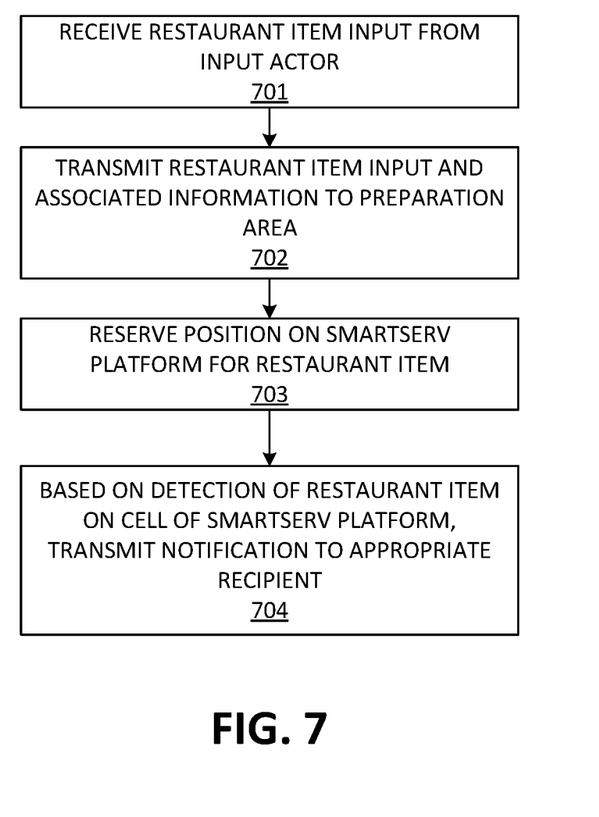
FIG. 7 illustrates a second exemplary embodiment of method steps associated with using a Smartserv platform.

Referring now to FIG. 7, an exemplary method for distributing restaurant items using an illuminated Smartserv platform is illustrated. At method step 701, a restaurant item input is received into a server from an input actor. In some embodiments, the input actor could be a user, wait staff, food runner, or other entity motivated to transmit an order for a restaurant item. The restaurant item may be a drink (alcoholic or otherwise), food, restaurant accessories (e.g., condiments or garnishes), or item that a restaurant customer may wish to procure from restaurant staff. The restaurant item input may be input to and/or received in a smart device, server, or other communications apparatus. In some embodiments, the input actor may provide the restaurant item input through an application integrated into the restaurant's point-of-sale system. In some embodiments, the application may include customization options for the restaurant item (e.g., desired spirit type, desired condiments, substitutions). In some embodiments, the customer simply places the order for restaurant items at a bar associated with the restaurant.

At method step 702, the restaurant item input and associated order information is transmitted to a preparation area. The preparation area may be a bar, back kitchen, or the like. In exemplary embodiments, the associated order information may be a color or other identifier assigned to the order associated with the restaurant item input. For example, an order may include a drink (e.g., margarita), a customization option (e.g., sugar rim and extra tequila), and an assigned color (e.g., blue). In embodiments in which the customer orally places the order at the bar, the bartender or other personnel may orally convey the assigned color to the customer at this juncture.

The assigned color may correspond to a colored square on the Smartserv platform on which the ordered restaurant item may ultimately be placed. Accordingly, At method step 703, a position may be deserved on the Smartserv platform for the restaurant item. As described elsewhere, the Smartserv platform is a smart tray divisible into one or more cells. The cells may be bordered by indicators, such as LED lights, to identify a specific cell and correlate that cell with an order. In some embodiments, the cells may be of equal sizes, while in other embodiments, one or more cells may be dynamically sized according to the item placed on the cell. In some exemplary embodiments, LED lights may form a perimeter of a cell, while in other embodiments, LED lights may permeate the cell to allow the entire cell to be illuminated with a chosen color. In exemplary embodiments, the LED lights on a chosen cell are illuminated according to the color assigned At method step 702.

The indicators on a cell may provide information about the occupancy status of the cell. For example, a cell may have a default color to indicate that it is unoccupied. In exemplary embodiments, an unoccupied and unreserved cell may simply have no illumination, though it may have other indicators to illustrate the borders of the cell. In some embodiments, the indicators may turn a set color after an order has been removed from its cell to indicate a recent departure from the cell.

Additionally, the Smartserv platform may have other indicator lights. For example, the embodiments shown elsewhere herein contemplate illuminated cell borders in which the illumination color is visible while looking down at the top plane of the Smartserv platform from above. However, in some embodiments, the Smartserv platform may have lateral lights to provide notification information at a distance. For example, if a cell is illuminated in blue on the Smartserv platform to indicate that the order associated with user (or order) "blue" is ready, then a light on the side of the Smartserv platform may also glow blue. Moreover, if a second cell on the Smartserv platform is illuminated in red to indicate that the order associated with user (or order) "red" is ready, then the light on the side of the Smartserv platform may alternate between blue and red lights. In this manner, a user at a distance can quickly determine whether the user's order is ready.

Moreover, characteristics of the indicator light may vary based on a quality of the restaurant item placed on top of it. For example, the size of the light display may vary based on the item type (e.g., a plate may need a larger color ring than a drink). Similarly, the color may be based on a condition of the cell (e.g., particularly in embodiments in which a cell has thermal properties, the color may be warmer to indicate a warm restaurant item or colder to indicate a cold restaurant item). Changing patterns in the lights may also be used as an indicator (e.g., flashing lights).

At method step 704, based on detection of a restaurant item on the appropriate cell of the Smartserv platform, notification is transmitted to the appropriate recipient. For example, in some embodiments, a notification is transmitted to the customer who placed the order. The customer may then proceed to the Smartserv platform and collect the restaurant item located on the customer's assigned color on the Smartserv platform. In other embodiments, the appropriate recipient may be a waiter or other food runner.

Detection of the restaurant item on the appropriate cell of the Smartserv platform may be made by a variety of means, such as any of: breaking of an infrared light beam passing through the cell (analogously to a motion detector), weight detection on the cell, or detection of photons on the cell (or a lack thereof). Multiple detection means may be useful for quality control (e.g., it may require both the breaking of an infrared beam and a weight detection to properly register the presence or absence of a plate or a drink).

The notification may be transmitted to the recipient's smart device or other communications apparatus associated with the recipient. The notification may include an assigned color, cell identification information, or information about the ordered restaurant item. For example, the notification may be transmitted to the ordering-customer's smart phone application and inform the customer that the customer's "margarita with extra tequila and a sugar rim is ready on the blue square located on Smartserv platform 3, row 4, column 2." This may also cause a lateral light on Smartserv platform 3 to begin blinking in a blue color. In simpler embodiments, the notification may simply cause the customer's smart phone to display that the customer's restaurant item is ready for pickup on the cell corresponding to the assigned color.

Notification may be achieved through various means. In exemplary embodiments, notification may be transmitted to the customer (or other appropriate recipient, such as a waiter) through an application associated with the restaurant. Notification software may integrate directly with the API of the restaurant's application. In other embodiments, a stand-alone application may be provided to the end user. The application may be capable of transmitting the order for restaurant items and receiving the relevant order-pickup information (e.g., color square of Smartserv platform at which fulfilled order is located). In some embodiments (especially embodiments in which a customer orally tells a bartender the customer's order, and in return, receives a color), the application may simply be capable of receiving a notification that the order is ready and reminding the customer of the appropriate color.

In some embodiments, multiple notifications may be generated. For example, a notification may be sent to a customer (and the notification may include a receipt), while another notification goes to a server. The server may then bring the restaurant item to the customer.

Figure 8:
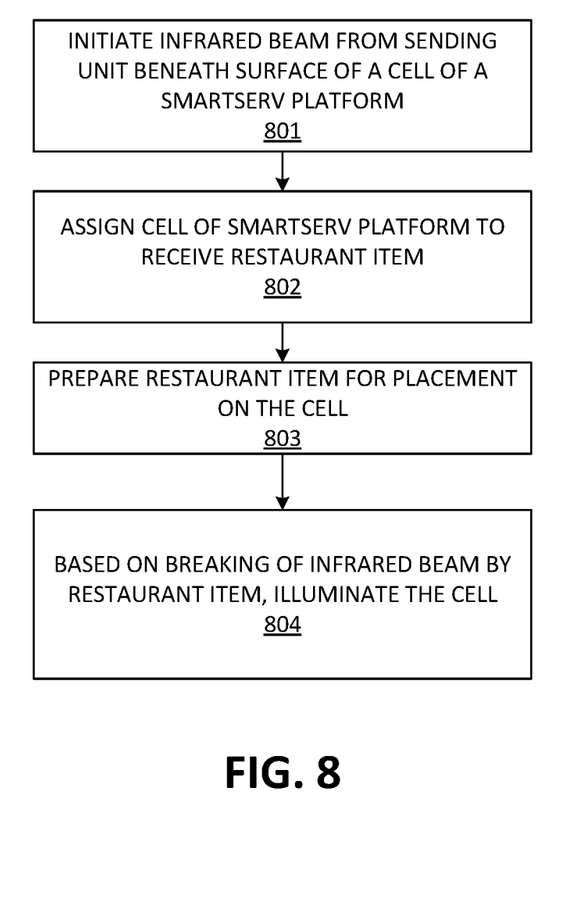
FIG. 8 illustrates an exemplary embodiment of a method for deploying cells associated with a Smartserv platform.

Referring now to FIG. 8, a method of cell deployment using a Smartserv platform is shown. At method step 801, a cell having an LED light strip and a semi-transparent surface may have an infrared beam initiating from a sending unit beneath the surface and terminating at a receiving unit above the Smartserv platform. In some embodiments, the LED light strip may be illuminated to a default color indicating availability (e.g., green), or it may be simply remain unilluminated until step 802.

At method step 802, based on receipt in the restaurant item preparation area (e.g., bar, back kitchen) of an order, assign a cell of the Smartserv platform to receive the restaurant item. In exemplary embodiments, this assignment will include at least a cell identification (e.g., a platform number, a row number, and a column number; or, if the cells are sub-divisible, then in some embodiments, a visual notification identifying a region of the Smartserv platform may be appropriate) and an assigned color (e.g., blue). In some embodiments, the assigned cell will be illuminated in a temporary color (e.g., yellow) to indicate that the cell is reserved.

At method step 803, the restaurant item is prepared for placement on the appropriate cell.

At method step 804, based on a breaking in the infrared beam (or other similar detection means, such as a weight sensed on the cell), the reserved cell is illuminated in the assigned color (in this example, blue). In some embodiments, the illumination may take the form of a pattern (e.g., blinking lights) or be sized differently based on the size of the item placed on the cell. In some embodiments, secondary notification lighting on the Smartserv platform may illuminate to inform customers at a glance of item availability.

Figure 10:
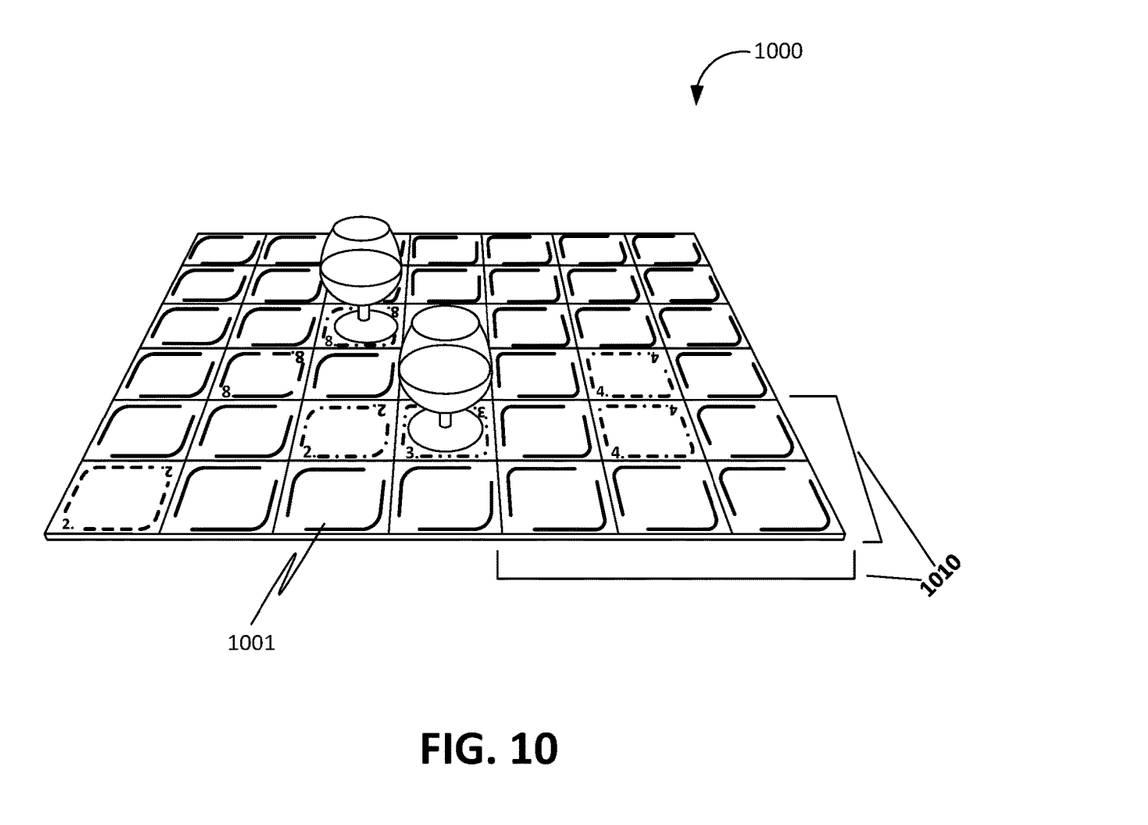
FIG. 10 illustrates a modular embodiment of the Smartserv platform.

Referring now to FIG. 10, a larger Smartserv platform 1000 is shown. As shown, Smartserv platform 1000 is adaptable to larger needs, based on the restaurant. In some embodiments, larger Smartserv platform 1000 may be comprised of one or more smaller sets of Smartserv platforms 1010 (shown here as one exemplary 3×2 smaller Smartserv platform 1010). These smaller sets may be 1×1 panels, or larger sets of preassembled platforms. Some of these platforms may have connecting panel 1001. Connecting panel 1001 may be a standard panel (like those shown in FIG. 2), and it may have additional connectivity elements to allow one set of panels to connect to another. For example, connecting panel 1001 may have Bluetooth, NFC, Wi-Fi, or other connectivity means. Connecting panel 1001 may also have an adhesive means on the side to allow it to bind (temporarily or fixedly) to another individual Smartserv platform 1010.

In this modularity embodiment, each individual Smartserv platform (i.e., set of panels) may be operable as Smartserv platform 100 on its own. Accordingly, some or all individual Smartserv platforms 1010 may have its own controller, connectivity means, etc., to allow it to fully integrate with an API and network infrastructure of the type shown in FIG. 4.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A Smartserv platform comprising:
a planar surface divided into a plurality of cells;
a network access device in logical connection with a communications network;
a controller in logical connection with the network access device; and
a first LED circuit fixedly attached to each cell, wherein the first LED circuit comprises one or more LEDs, is in logical connection with the communications network, and is configured to illuminate in a first illumination pattern and in a first illumination color based upon a transmission via the communications network indicating a received restaurant item order, wherein the restaurant item order comprises a restaurant item and one or both of the first illumination pattern and the first illumination color.

2. The Smartserv platform apparatus of claim 1, wherein each cell further comprises a sensor operative to detect the placement of the restaurant item on the cell and to transmit a detection confirmation to the controller upon detection of the placement of the restaurant item on the cell, and to detect the removal of the restaurant item from the cell and to transmit a removal confirmation to the controller upon detection of the removal of the restaurant item from the cell.

3. The Smartserv platform of claim 2, wherein the sensor comprises a motion detector.

4. The Smartserv platform of claim 2, wherein the sensor comprises a weight sensor.

5. The Smartserv platform of claim 2, wherein the sensor comprises an infrared emitter.

6. The Smartserv platform of claim 2, wherein the LED circuit is operative to deactivate the illumination based upon a measurement by the sensor that the restaurant item has been removed from the cell.

7. The Smartserv platform of claim 6, wherein based on receipt of a second restaurant item order while the first restaurant item order is unfulfilled, the controller is operative to designate a second LED circuit and associate cell to illuminate in a second illumination color.

8. The Smartserv platform of claim 7, wherein the designation of the second LED circuit is based upon maximizing a distance between the first LED circuit and the second LED circuit.

9. The Smartserv platform of claim 2, wherein the controller is configured to transmit a notification to a smart device of an end user via the communications network upon detection of the restaurant item on the cell.

10. The Smartserv platform of claim 2, further comprising a second LED circuit fixedly attached to a side of the planar surface and in logical connection with the controller, wherein the second LED circuit is operative to illuminate in the first illumination color upon receipt by the controller of the detection confirmation.

11. The Smartserv platform of claim 10, wherein the second LED circuit is operative to illuminate in a second illumination color upon receipt by the controller of a detection confirmation from a sensor associated with a different cell than the cell associated with the first illumination color, and wherein the second LED circuit is operative to alternate between illuminating in the first and the second illumination color.

12. The Smartserv platform of claim 2, further comprising a transceiver operable to logically connect the Smartserv platform with a second Smartserv platform.

13. A method for visually stimulating restaurant item distribution, the method comprising the steps of:
  receiving a restaurant item order into a server, wherein the order comprises one or more restaurant items to be distributed;
  appending to the restaurant item order a color-coding command;
  transmitting an order signal to a controller in logical connection with a Smartserv platform apparatus, wherein the order signal comprises information for highlighting one or more designated cells on the Smartserv platform apparatus according to the color-coding command and the number of restaurant items in the restaurant item order;
  based upon receipt of a readiness signal from the Smartserv platform indicating that the restaurant item has been placed on the designated cell of the Smartserv platform, transmitting a notification to a smart device associated with a waiter or a patron; and
  based upon receipt of a removal signal indicating that the restaurant item has been removed from the designated cell of the Smartserv platform apparatus, transmitting a deactivation signal to deactivate the highlighted areas on the Smartserv platform apparatus.

14. The method of claim 13, further comprising the step of: verifying, based on geofencing, that the restaurant item order was transmitted by a device proximate to a restaurant item fulfillment station.

15. The method of claim 14, wherein the color-coding command comprises a specified color associated with a user order.

16. The method of claim 14, wherein the color-coding command comprises a color pattern to be displayed on the cell.

17. The method of claim 14, wherein the color-coding command further comprises a queue number.

18. The method of claim 14, wherein the readiness signal is generated from a motion detector.

19. The method of claim 14, wherein the readiness signal is generated from a weight sensor.

20. The method of claim 14, further comprising the step of: transmitting an illumination signal to a secondary notification light associated with the Smartserv platform.

* * * * *